(12) United States Patent
Trajkovich

(10) Patent No.: US 8,079,470 B2
(45) Date of Patent: Dec. 20, 2011

(54) HEAT SEALABLE LAMINATING FILM

(76) Inventor: Anthony Trajkovich, Fontana, WI (US)

( * ) Notice: Subject to any disclaimer, the term of this patent is extended or adjusted under 35 U.S.C. 154(b) by 1226 days.

(21) Appl. No.: 11/671,343

(22) Filed: Feb. 5, 2007

(65) Prior Publication Data

US 2008/0185310 A1 Aug. 7, 2008

Related U.S. Application Data

(62) Division of application No. 10/847,964, filed on May 18, 2004, now abandoned.

(51) Int. Cl.
*B32B 3/26* (2006.01)
*B32B 27/10* (2006.01)
*B32B 27/18* (2006.01)
*B32B 27/36* (2006.01)
*B32B 37/15* (2006.01)

(52) U.S. Cl. ............. 206/387.13; 206/0.8; 206/307; 206/308.1; 206/308.3; 206/387.1; 206/315.1; 206/461; 206/470; 206/472; 206/473; 206/524.1; 206/524.2; 206/524.3; 206/524.4; 206/524.6; 428/480; 428/481; 428/483; 156/290; 156/297; 156/308.2; 156/308.4; 156/327; 264/173.16; 264/291; 264/292; 264/399; 264/331.11; 264/571

(58) Field of Classification Search .................... None
See application file for complete search history.

(56) References Cited

U.S. PATENT DOCUMENTS

| | | | | |
|---|---|---|---|---|
| 4,011,358 A * | 3/1977 | Roelofs | ............. | 428/516 |
| 4,266,812 A | 5/1981 | Staats | | |
| 4,322,003 A * | 3/1982 | Long | ............. | 206/525 |
| 4,341,307 A * | 7/1982 | Shyers | ............. | 206/472 |
| 4,373,002 A * | 2/1983 | Petersen-Hoj | ............. | 428/213 |
| 4,405,400 A * | 9/1983 | Petersen-Hoj | ............. | 156/244.11 |
| 4,539,793 A * | 9/1985 | Malek | ............. | 53/469 |
| 4,595,611 A * | 6/1986 | Quick et al. | ............. | 428/34.2 |
| 4,691,827 A | 9/1987 | Grace et al. | | |
| 4,765,999 A * | 8/1988 | Winter | ............. | 426/113 |
| 4,806,398 A * | 2/1989 | Martin, Jr. | ............. | 428/34.2 |
| 4,824,957 A * | 4/1989 | Amick | ............. | 548/213 |
| 4,892,195 A * | 1/1990 | Slavin et al. | ............. | 206/473 |
| 5,060,814 A | 10/1991 | Oglesbee | | |
| 5,154,293 A * | 10/1992 | Gould | ............. | 206/461 |
| 5,244,091 A | 9/1993 | Tannenbaum | | |
| 5,292,471 A * | 3/1994 | Ito et al. | ............. | 264/173.16 |
| 5,307,934 A * | 5/1994 | Hagner | ............. | 206/471 |
| 5,323,898 A | 6/1994 | Kester | | |
| 5,405,000 A * | 4/1995 | Hagedon et al. | ............. | 206/216 |
| 5,484,632 A * | 1/1996 | Mercer et al. | ............. | 428/35.7 |
| 5,522,506 A * | 6/1996 | Roulin et al. | ............. | 206/531 |

(Continued)

FOREIGN PATENT DOCUMENTS

JP 05-212840 * 8/1993

*Primary Examiner* — Vivian Chen

(74) *Attorney, Agent, or Firm* — Boyle Fredrickson, S.C.

(57) ABSTRACT

A themolaminating film for receiving a blister portion in the construction of a reusable package is described. A base blister portion configured to receive some form of media or material is molded from a formable heat sealable polymer such as PETG. A film consisting of a first layer of an amorphous polyester such as APET for heat sealing to the PETG, a second layer of a polyester such as PET, and an adhesive layer is used to laminate a graphical paper based cover thereby allowing the laminated cover to be heat sealed to the blister portion. In a preferred embodiment, the PET and APET are preferably coextruded.

1 Claim, 3 Drawing Sheets

U.S. PATENT DOCUMENTS

| | | | |
|---|---|---|---|
| 5,527,662 A * | 6/1996 | Hashimoto et al. | 430/296 |
| 5,626,969 A | 5/1997 | Joson | |
| 5,653,335 A | 8/1997 | Bauer et al. | |
| 5,775,516 A * | 7/1998 | McCumber et al. | 206/470 |
| 5,887,410 A * | 3/1999 | Lowenthal | 53/440 |
| 5,888,599 A * | 3/1999 | Bradt | 428/35.7 |
| 5,931,291 A | 8/1999 | Sedon et al. | |
| 5,942,297 A * | 8/1999 | Speer et al. | 428/35.4 |
| 6,004,251 A | 12/1999 | Herrin | |
| 6,060,137 A | 5/2000 | Akao | |
| 6,070,723 A | 6/2000 | Lewis | |
| 6,170,663 B1 | 1/2001 | Glassman | |
| 6,224,706 B1 | 5/2001 | Matich | |
| 6,271,291 B1 * | 8/2001 | McWilliams et al. | 524/236 |
| 6,276,529 B1 * | 8/2001 | Feehan, Jr. | 206/469 |
| 6,358,579 B1 * | 3/2002 | Peiffer et al. | 428/35.7 |
| 6,398,026 B1 * | 6/2002 | Parsons | 206/349 |
| 6,401,926 B1 * | 6/2002 | Lo | 206/531 |
| 6,409,020 B1 | 6/2002 | Lo | |
| 6,503,549 B1 * | 1/2003 | Mueller | 426/396 |
| 6,503,617 B2 * | 1/2003 | Jacobsen et al. | 428/336 |
| 6,589,616 B2 * | 7/2003 | Muggli et al. | 428/35.2 |
| 6,592,978 B1 | 7/2003 | Miller et al. | |
| 6,663,977 B2 * | 12/2003 | Kurian et al. | 428/480 |
| 6,685,022 B2 * | 2/2004 | Sullivan | 206/472 |
| 6,740,394 B2 * | 5/2004 | Jacobsen et al. | 428/216 |
| 6,814,913 B2 * | 11/2004 | Mueller | 264/173.13 |
| 6,939,584 B2 * | 9/2005 | Sankey et al. | 427/393.5 |
| 6,959,809 B2 * | 11/2005 | Begim | 206/232 |
| 7,318,524 B2 * | 1/2008 | Compton et al. | 206/308.1 |
| 2001/0008240 A1 * | 7/2001 | Herrin | 220/359.2 |
| 2001/0013475 A1 | 8/2001 | Holmes | |
| 2002/0162771 A1 * | 11/2002 | Van Wagenen et al. | 206/775 |
| 2002/0168535 A1 | 11/2002 | Proserpio | |
| 2003/0106287 A1 | 6/2003 | Yanuzzi et al. | |
| 2003/0150770 A1 | 8/2003 | Campbell et al. | |
| 2003/0203141 A1 | 10/2003 | Blum et al. | |
| 2003/0213555 A1 | 11/2003 | Bernardi et al. | |
| 2004/0035876 A1 | 2/2004 | Lo | |
| 2004/0052993 A1 * | 3/2004 | Dawes | 428/35.7 |

* cited by examiner

HEAT SEALABLE LAMINATING FILM

CROSS REFERENCE TO RELATED APPLICATIONS

This application is a divisional of U.S. patent application Ser. No. 10/847,964 filed on May 18, 2004 now abandoned, which is hereby incorporated herein by reference in its entirety.

BACKGROUND OF THE INVENTION

1. Field of the Invention

The present invention relates in general to improved packaging methods and materials. More particularly, the present invention relates to a thermolaminated specialty package grade film for receiving a blister portion. Specifically, a preferred embodiment of the present invention relates to a thermolaminated multilayered film comprising, a layer of an amorphous polyester, a layer of a polyester, and an adhesive layer wherein the amorphous polyester layer can be heat sealed or RF induced to a blister portion molded from a formable polyester.

2. Discussion of the Related Art

Product packaging and containers often form an essential element of the marketability of a commercial product. Improved packaging of a product can increase the sales appeal of a packaged product, as well as increase or decrease the cost of a commercial product. For several years, a variety of plastics have been utilized to develop packaging. In more recent times, thermoformed plastic packaging has become extremely popular for a variety of applications. For instance, two piece thermoformed blister packages such as "clamshell packages" are readily used to package a wide variety of materials including tools, toys and other products. The clamshell package generally includes two or more plastic members which are held together at their periphery by mechanical structures such as ridges, by glue, by the use of a solvent, or by a heat seal. Clamshell packages may also be formed from a single sheet of material. In most applications, both the cover and container are thermoformed in the single sheet separated from one another by a fold or hinge. When the sheet is folded over onto itself, the cover and container are brought into engagement so as to form a complete package.

While the existing clamshell packaging is useful in some applications, most are designed for a single use, wherein the container is intended to be thrown away once it has been used. While this is suitable for certain applications, the existing thermoformed clamshell packaging does not, in most instances, provide a reusable storage medium wherein a permanent storage container is utilized. Furthermore, in most cases, these clamshell packages provide a clear shell, wherein graphical inserts may be placed inside freely or glued to one portion of the packaging. The existing clam shell packaging, however, does not allow for a reusable package, wherein a laminated graphical cover may be used instead of the loose insert.

One representative area in which thermoformed packaging has been expanded, is in the manufacture and sale of entertainment and/or digital materials such as cases for videos, CDs, CD ROMs and DVDs. Sales and distribution of CDs, CD ROMs and DVDs has grown considerably in recent years, and along with this growth have been many attempts to construct reusable storage cases for such discs. The traditional case is the plastic "jewel-box." This type of CD case is constructed of two clear plastic pieces that are hinged together. The plastic used is typically injection-molded polystyrene, which is a rigid, brittle plastic. In the center of the pieces are elements that serve to mount the CD within the case and to prevent any part of the case from contacting the surface of the CD.

While these jewel-box types of CD cases serve to protect the CD from contact with dirt and impact, they can be easily broken if dropped. The plastic cases increase the weight of the CD package and increase shipping costs, which can become very expensive in the mass production and distribution of compact discs, such as for promotions by computer on-line service companies, or by mail-order music companies. Furthermore, the graphical cover is most often loosely inserted within one of the plastic pieces. Such inserts are easily lost, and do not always provide a nice finished look to the storage case.

Furthermore, the mass production of plastic jewel-box CD cases has raised many environmental concerns, especially since polystyrene can not be easily recycled and its manufacture is potentially environmentally hazardous. Thus, there has been an effort in the industry to construct a CD storage cases and other specialty storage containers that minimizes the use of brittle polystyrene in place of more environmentally safe products. One solution to the jewel box has been to mount a plastic support having a hub for attaching the CD within a cardboard jacket. Examples of such products are shown in U.S. Pat. Nos. 5,419,433 and 5,421,453, both to Harrer et al. While these patents are an improvement over the traditional jewel-box type case, they still require the use of several components to construct, and still require the use of a plastic insert to mount the CD, usually with glue or some other adhesive. As a result, the plastic insert can be easily peeled away and the bond is loosened due to the effects of moisture. Furthermore, the paper cover is prone to peeling and rapid deterioration thereby not allowing for clean, finished look.

The problems in the CD packaging industry is illustrative of a larger problem in the packaging industry as a whole. While blister receiving portions are useful in the packaging industry because they can be formed to receive an infinite amount of materials, there does not currently exist a reasonable cost effective means to affix the blister portion to a laminated cover in a reusable package or container. The use of glue and other adhesives has proved ineffective in mounting the blister portion to the cover. When glues or other adhesives are used, the edges of the blister portion are prone to peeling and are often easily removed from the cover portion such that the package or container is not long lasting or adequate.

Furthermore, in any application, the cost of packaging is a source of tremendous competition such that scrutiny by product manufacturers is often intense. Consequently, packagers are extremely cost sensitive. Packagers are also coming to grips with the ever increasing problems of waste plastic disposal. Plastic packages are coming under sharp criticism because of their relatively short useful life, their relatively long decomposition time, and their growth as a waste product. These problems are in addition to the normal challenges of providing an attractive, useful package for a growing diversity of products. Thus, package manufacturers are being asked to balance manufacturing needs, customers' desires and environmental concerns on a scale never before imagined.

To complicate matters, many materials useful for forming packages and laminating are often unacceptable for one reason or another. For example, polyvinyl chloride (PVC) makes an excellent package as the material is relatively inexpensive, clear, tough, durable and easy to seal shut using a heat sealing process. PVC is often, however, perceived to be environmentally unfriendly. Therefore, there is pressure on manufacturers to use alternative materials. Polyethylene terephthalate (PET), can be used for packaging. PET, while more expensive than PVC, is clear, durable and recyclable. However, PET cannot be easily heat sealed or solvent sealed and this limits its broad applicability.

Finally, while the packaging industry has developed to meet the needs of the largest industries, there remains several smaller market products that require improved reusable packaging to increase the marketability of their products. Such areas as commemorative coin market or souvenir market do not currently have a good variety of alternatives for use in packaging. Several of these niche markets need a reusable storage container wherein a decorative laminated cover could be used to advertise the product while on the shelf.

SUMMARY AND OBJECTS OF THE INVENTION

In view of the foregoing, it is one object of the present invention to provide a thermolaminating film that allows for heat sealing or RF-sealing to a blister portion thereby allowing for the formation of a reusable storage container/package without the use expensive films or papers. It is another object of the invention to provide a thermoformed container utilizing a thermolaminating film that uses fewer materials, provides a finished look and is more easily recyclable than existing containers. Yet another object of the invention is to provide a process that can be used to relatively inexpensively manufacture a thermoformed container using a thermolaminating film that is flexible, crack resistant and durable. Still another object of the invention is to provide a thermolaminating film which supports high quality and high clarity graphics yet is economical to manufacture and easy to install using existing equipment.

Consistent with the foregoing objects, and in accordance with the invention as embodied and broadly described herein, a laminating film, a laminated container, and a process for forming a thermolaminated container are disclosed in suitable detail to enable one of ordinary skill in the art to make and use the invention. In one preferred embodiment, a thermolaminating film for heat sealing to a container, includes a first layer comprised of an amorphous polyester, a second layer comprised of a polyester connected to the first layer and a third layer, comprised of an adhesive parallel to the second layer.

In yet another preferred embodiment, a specialty container is disclosed comprising a receiving portion formed from a polymeric base layer, a thermolaminating film including an amorphous polyester first layer, and a polyester second layer parallel to the first layer applied to the polymeric base layer, an adhesive layer applied to the thermolaminating film and a graphical layer comprised of paper on the bottom of the container.

In yet another preferred embodiment, a process for forming a thermolaminated specialty package is disclosed comprising molding a shaped blister container from a polymeric base layer, applying an amorphous polyester layer onto the polymeric base layer, applying a polyester layer onto the amorphous polyester layer, applying an adhesive onto the polyester layer, and applying a paper based graphical layer onto the polyester layer.

In yet another preferred embodiment, a thermolaminated film for receiving a blister portion in the construction of a reusable book-like package is described. A base blister portion configured to receive some form of media or material is molded from polyethylene terephthalate glycol (PETG). A film consisting of a first layer of amorphous polyethylene terephthalate (APET) for welding to the PETG, a layer of a polyester preferably polyethylene terephthalate (PET), and an adhesive layer is used to laminate a graphical paper based cover thereby allowing the cover to be heat sealed to the blister portion. In the preferred embodiment, the PET and APET are preferably coextruded. The inventive packaging may be used for numerous applications such as packaging or storing media and/or materials such as a CDs, videos, toys, or commemorative coins.

These, and other, aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

DETAILED DESCRIPTION OF THE INVENTION

Figure 2:
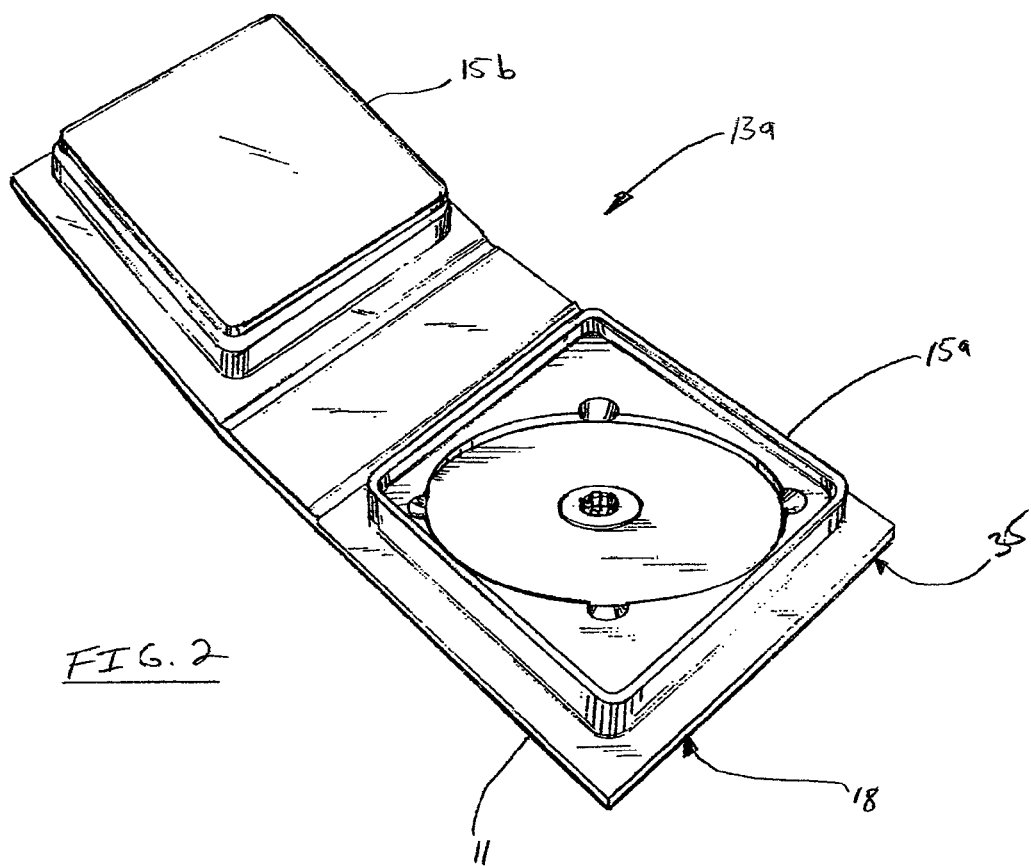
FIG. 2 is a perspective view of a CD case incorporating the inventive film.

In describing the preferred embodiments of the invention which are illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word "connected" or "bonded" or terms similar thereto are often used. Such terms are not limited to direct connection but include connection through other elements where such connection is recognized as being equivalent by those skilled in the art.

1. System Overview

In its most basic form, the invention is a multilayered laminating film for receiving a blister portion in a package or container assembly. The multilayered laminating film of the present invention allows for a layered laminated graphical cover portion to be directly sealed to a blister receiving portion while exhibiting superior adhesive properties. The film preferably includes a coextruded laminate with a heat sealable layer on one side that allows the laminate to be heat sealed to the separately formed blister portion. This results in a significant reduction in the effects of moisture onto the package as compared to traditional means of using some alternative form of adhesive to attach various components. The remaining layers of the film create a laminating film that is flexible and crack and scratch resistant and comprised from relatively inexpensive materials.

2. Detailed Description of Preferred Embodiments

Figure 1:
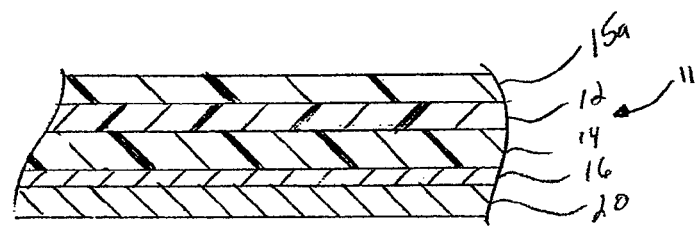
FIG. 1 is a schematic cross-sectional view of a container wherein the inventive film is laminated to a cover portion and heat sealed to a blister portion.
Figure 3:
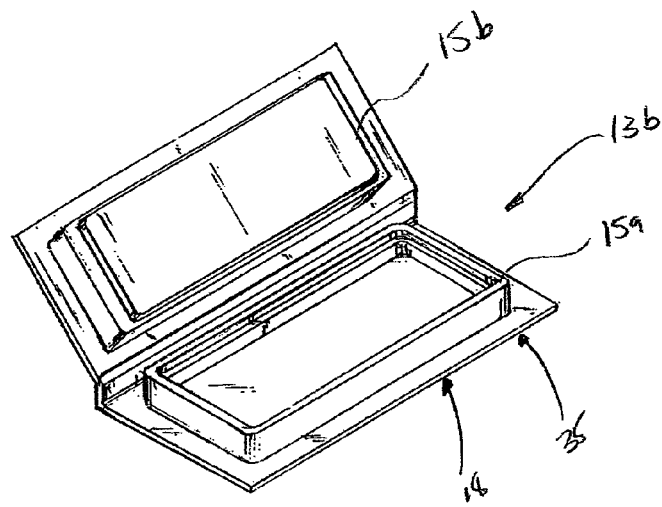
FIG. 3 is a perspective view of a video cassette case incorporating the inventive film.
Figure 4:
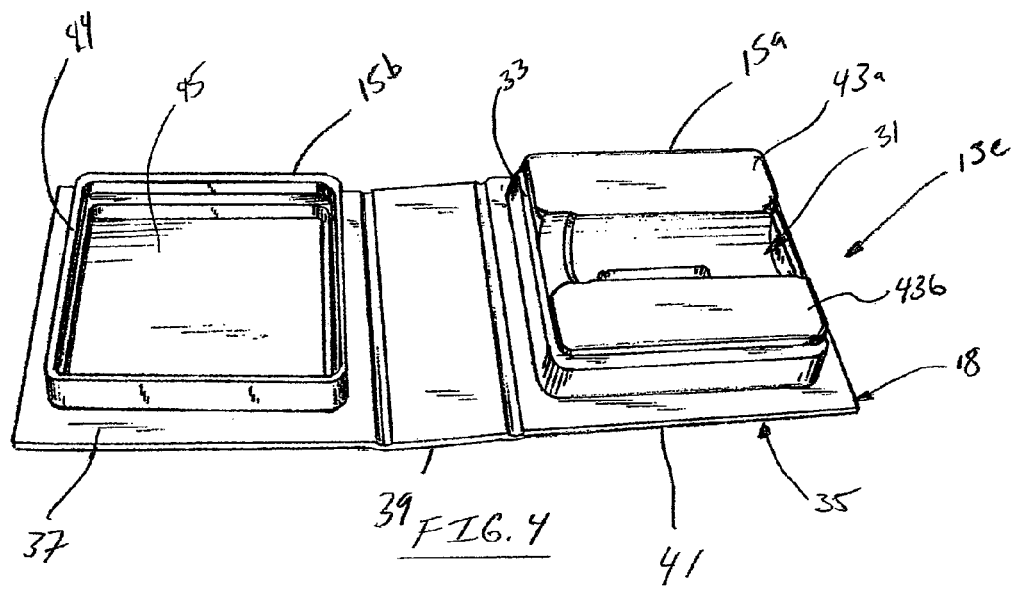
FIG. 4 is a perspective view of a collective coin case incorporating the inventive film.
Figure 5:
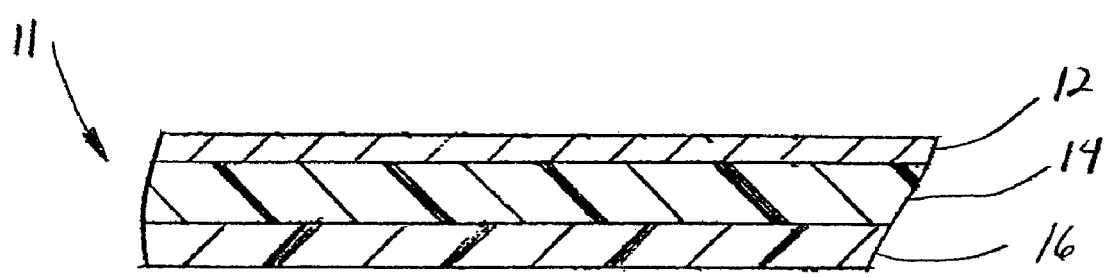
FIG. 5 is a schematic cross-sectional view of the inventive laminating film.

A cross sectional view, illustrating the different layers of a container or package with a blister portion and a laminated cover utilizing the multilayered film of the invention is depicted in FIG. 1. FIGS. 2-4 depict various book-like packaging configurations or containers 13a-c of the invention, prior to insertion of a product into the blister receiving portion. FIG. 5 illustrates a cross section of the three layered inventive film.

Referring initially to FIGS. 2-4, specialty containers 13a-c are preferably comprised of a thermoformable polymer. For example, here two blister receiving portions 15a and 15b are formed separately from the laminate 18 discussed below. The blister receiving portions 15a, 15b are molded from a polymeric, substantially heat sealable material. Referring to the cross section of the specialty containers 13a-c illustrated in FIG. 1, the blister receiving portions 15a, 15b form an initial polymeric base layer of the cross section of the specialty container 13a-c. The blister receiving portions 15a, 15b, could be comprised of a variety of substantially heat sealable polymeric materials, and are preferably molded from a formable polyester such as polyethylene terephthalate glycol (PETG).

Alternatively, the blister receiving portions 15a, 15b could be molded from several other substantially heat sealable formable materials such as polyamides, polyesters, polyolefins, including polyethylenes (PE) and polypropylene (PP), polyvinyl chloride (PVC), polyvinylidene chloride (PVdC), cyclic olefin copolymers (COC), polystyrene (PS), acrylics such as Barex®, and combinations thereof. Non-limiting examples of suitable polyethylenes are low density polyethylene (LDPE), linear low density polyethylene (LLDPE), linear medium density polyethylene (LMDPE), linear very-low density polyethylene (VLDPE), linear ultra-low density polyethylene (ULDPE), high density polyethylene (HDPE). However, as noted above, it is preferred that a glycol modified polyester such as polyethylene terephthalate (PETG) is used.

The PETG is thermoformed into blister receiving portions 15a, 15b or other shaped container using techniques that are well known in the art. As illustrated by FIGS. 2-4, and more specifically by the alternative specialty containers 13a, 13b, 13c, and discussed in greater detail below, the blister receiving portions 15a, 15b could be molded into a variety of configurations to receive any variety of packaged materials using techniques that are well known in the art. As discussed below, the portions 15a, 15b of the preferred embodiment are molded to be press fitted within one another when the book-like containers 13a-c are closed, however a wide variety of portions and closure mechanisms are possible. Such tight-fitting packages are often called "blister" or clam-shell packages.

In the preferred embodiment, the polymeric receiving portions 15a, 15b are heat sealed or RF induced onto the laminating film 11 of a separately formed laminate 18 which comprises the cover 35 of the containers 13a-c. The laminating film 11, of the laminate 18 is comprised of a coextruded polymeric film with a heat sealable layer on at least one side. The inventive laminating film 11 is applied over a laminate base 20 using techniques well known in the art.

The laminate base 20 could be comprised of a variety of commonly used materials. For example, preferably, the laminate base 20 could be comprised of successive layers of paper, starch or animal based glue, cardboard stock, starch or animal based glue, paper, ink, and/or an adhesive, a graphic printed on a polyester and an acrylic top coating as is known in the art.

Referring to FIGS. 1 and 5, the laminating film 11 is laminated over the laminate base 20 using techniques known in the art. The laminating film 11 is comprised of a substantially heat sealable polymeric first layer 12 comprised of, for example an amorphous polyester. Preferably the amorphous polyester first layer 12 is comprised of amorphous polyethylene terephthalate (APET). The amorphous polyester first layer 12 is preferred because it exhibits a relatively high polarity that enables the film 11 to be heat sealed or RF induced to the PETG forming the blister portions 15a, 15b of the containers 13a-c.

Adhered to the first heat sealable polymeric layer 12 of the laminating film 11 is a polymeric second layer 14. Preferably the polymeric second layer 14 of the laminating film 11 is comprised of a polyester such as polyethylene terephthalate (PET). The PET is preferred because it adds strength to the APET of the polymeric first layer 12 of the laminating film 11 and prevents scratching or degrading of the laminating film 11 while allowing the film 11 to be bent and formed into the illustrated cover 35 of the illustrated containers 13a-c. Although its strength is desired, the PET is much less polar than the APET and other materials that are readily heat sealed or RF-induced. As such, PET alone would likely not provide a preferred laminating material. Thus, the combination of the polymeric first layer 12 of APET and polymeric second layer 14 of PET provide a laminating film 11 that is both durable and heat sealable. Although the first 12 and second 14 polymeric layers of the laminating film 11 could be applied separately, preferably the PET and the APET are coextruded such as in the commercially available SL 10 manufactured by SKC, Inc. under the Skyrol® brand. Furthermore, it could also be possible to coextrude the PETG of the blister portion with the APET and PET.

Underneath the second layer 14 of the laminating film 11 is third adhesive layer 16, which allows for attachment of the laminating film 11 to the laminate base 20. The third adhesive layer 16 comprises an adhesive that exhibits excellent adhesion to the second polymeric layer 14 and the underlying laminate base 20. Any suitable adhesive may be used, including water-based and solvent-based adhesives and thermo-adhesives. For example, the adhesive layer 16 may comprise a blend of polyethylene copolymers and/or other polymeric materials, namely (1) an olefin-containing polymer selected from the group consisting of at least one functionalized polyolefin; at least one copolymer of ethylene and at least one comonomer selected from the group consisting of acrylic acid, alkyl acrylic acid, acrylates, and alkyl acrylates; and blends thereof and (2) a styrene-containing rubber. One type of olefin-containing polymer is a functionalized olefin polymer which contains at least one functional moiety. Among the functional moieties that may be employed are unsaturated carboxylic acids, unsaturated carboxylic acid anhydrides, amines and epoxies. Examples of olefins employable for the preparation of the modified polyolefins include homopolymers or copolymers of an alpha olefin such as ethylene, propylene, butene-1, pentene-1, hexene-1,4 methylpentene-1 and octene-1. Unsaturated carboxylic acids and anhydrides useful to modify the polyolefins include maleic acid and anhydride, fumaric acid and anhydride, crotonic acid and anhydride, citraconic acid and anhydride, itaconic acid and anhydride and the like. Suitable amines include aliphatic or aromatic, primary, secondary and tertiary amines.

Both the processes of co-extrusion and thermoforming are well known in the plastics art. For example, as noted above, it is recommended that the APET and PET of the first 12 and second 14 polymeric layers be attached by coextrusion. Coextrusion is a well known process wherein, for example, the polymeric material for the individual layers are fed into infeed hoppers of a like number of extruders, each extruder handling the material for one or more of the layers. The melted and plasticated streams from the individual extruders are fed into a single manifold co-extrusion die. While in the die, the layers are juxtaposed and combined, then emerge from the die as a single multiple layer film of polymeric material. After exiting the die, the film is cast onto a first controlled temperature casting roll, passes around the first roll, and then onto a second controlled temperature roll, which is normally cooler than the first roll. The controlled temperature rolls largely control the rate of cooling of the film after it exits the die. Additional rolls may be employed. In another method, the film forming apparatus may be one which is referred to in the art as a blown film apparatus and includes a multi-manifold circular die head for bubble blown film through which the plasticized film composition is forced and formed into a film bubble which may ultimately be collapsed and formed into a film. Processes of coextrusion to form film- and sheet laminates are generally known. Typical coextrusion techniques are described in U.S. Pat. Nos. 5,139,878 and 4,677,017 and are incorporated by reference.

Likewise, there are a wide variety of extruding devices used in plastics extrusion. For example, a single-screw extruder can be used. Single-screw extruders are amongst the most common and versatile extruders used in the industry today because of their ability to process a wide range of materials with great cost advantage. A more complete discussion of extrusion can be found in Chapter 4 of the 1991 Modern Plastic Encyclopedia, Volume 67, No. 11 published by McGraw-Hill of Hightstown, N.J. The entire text of Chapter 4 entitled "Primary Processing" is hereby incorporated by reference.

Thermoforming, or the deforming of a thermoplastic sheet with heat and pressure (or vacuums) to force the hot sheet against a mold base, is a common method of converting thermoplastic into useful products. Thermoforming is an extension of the original technologies used to forge metal sheets and, in some cases, paper. All of the variations and forming techniques used in thermoforming have common ground in getting movement or stretching of a heated sheet of plastic by applying vacuum, air pressure, or mechanical drawing or a combination of these three thereto. A more complete discussion of thermoforming can be found in pages 332-336 of the aforementioned Modern Plastics Encyclopedia. See also Plastic Engineering Handbook of the Society of the Plastic Industry, Inc., Fourth Edition, Edited by Joel Frados, available from Van Nostrand Reinhold Company, Copyright 1976 and, in particular, pages 156-203 and 272-325. The text of both are hereby incorporated by reference.

It is understood that each of the blister portion 15a, 15b and the film 11 layers may optionally also include one or more conventional additives whose uses are well known to those skilled in the art. The use of such additives may be desirable in enhancing the processing of the compositions as well as improving the products or articles formed therefrom. Examples of such include oxidative and thermal stabilizers, lubricants, release agents, flame-retarding agents, oxidation inhibitors, oxidation scavengers, dyes, pigments and other coloring agents, ultraviolet light absorbers and stabilizers, organic or inorganic fillers including particulate and fibrous fillers, reinforcing agents, nucleates, plasticizers, as well as other conventional additives known to the art. Such may be used in amounts, for example, of up to about 10% by weight of the overall composition. Representative ultraviolet light stabilizers include-various substituted resorcinols, salicylates, benzotriazole, benzophenones, and the like. Suitable lubricants and release agents include stearic acid, stearyl alcohol, and stearamides. Exemplary flame-retardants include organic halogenated compounds, including decabromodiphenyl ether and the like as well as inorganic compounds. Suitable coloring agents including dyes and pigments include cadmium sulfide, cadmium selenide, titanium dioxide, phthalocyanines, ultramarine blue, nigrosine, carbon black and the like. Representative oxidative and thermal stabilizers include the Period Table of Element's Group I metal halides, such as sodium halides, potassium halides, lithium halides; as well as cuprous halides; and further, chlorides, bromides, iodides. Also, hindered phenols, hydroquinones, aromatic amines as well as substituted members of those above mentioned groups and combinations thereof. Exemplary plasticizers include lactams such as caprolactam and lauryl lactam, sulfonamides such as o,p-toluenesulfonamide and N-ethyl, N-butyl benylnesulfonamide, and combinations of any of the above, as well as other plasticizers known to the art. Such additives may enhance the "archive" quality of the package and make it more durable.

The laminating film described above may have different thicknesses. For example, the thickness of the film comprised of the APET first layer 12, PET second layer 14 and adhesive layer 16 may range from about 0.7 mils to about 15 mils, and preferably from about 1 mils to about 3 mils.

While such thicknesses are preferred as providing a readily flexible film, it is to be understood that other film thicknesses may be produced to satisfy a particular need and yet fall within the scope of the present invention.

In the preferred embodiment of the invention, film 11 and the blister portions 15a, 15b are attached by heat sealing and lamination under heat and pressure. The blister portion is heat sealed to the film via the APET first layer 12. The film 11 is attached to the laminate base 20 by lamination via the adhesive layer 16. Lamination and heat sealing techniques are well known in the art. Typically, laminating is done by positioning the individual layers on one another under conditions of sufficient heat and pressure to cause the layers to combine into a unitary film. Typically the films are positioned on one another, and the combination is passed through the nip of a pair of heated laminating rollers by techniques well known in the art. Lamination of the film 11 on the laminate base 20 may be done at temperatures ranging, for example, from about 65 degrees C. to about 150 degrees C., preferably from about 82 degrees C. to about 126 degrees C., and at pressures ranging, for example, from about 5 psi to about 80 psi. Preferably, the laminating machines are run at about speeds of 1 foot per minute to 60 feet per minute.

Additionally, the blister receiving portions 15a, 15b are heat sealed to the laminating film 11 at suitable temperatures to bond the materials.

The various specialty containers 13a-c illustrated in FIGS. 1-5, are by way of illustration and are by no way limiting. It should be appreciated that the containers of the present invention could take a wide variety of shapes, sizes and configurations and could be constructed to receive virtually any commercial product. For example, FIG. 2 illustrates a specialty package 13a wherein the blister portions 15a and 15b are configured to receive a media containing disk e.g., DVD, CD or CD Rom. FIG. 3 illustrates yet another preferred embodiment wherein the package 13b includes blister portions 15a, 15b configured to retain, e.g., a video cassette. Finally, FIG. 4 illustrates a package 13c wherein the blister portions 15a, 15b are configured to retain a series of commemorative items, e.g., coins. Although the blister portions 15a, 15b are shown in each example as comprising two halves, it is conceivable that the blister portion could be comprised of a single piece mounted on one side of the laminate 18 forming the cover 35.

By way of example, turning to FIG. 4, a specialty container 13c is shown for retaining a series of commemorative coins (not shown). The container 13c is generally comprised of a cover 35 formed from the laminate 18 described above. The laminate 18 is comprised of a laminate base 20 formed from successive layers of paper, starch or animal based adhesive or glue, cardboard stock, starch or animal based glue, paper, ink, and/or an adhesive, a graphic printed on a polyester and an acrylic top coating. The decorative laminate base 20 can be formed using methods known in the art and then the inventive laminating film 11 is applied to the laminate base 20 forming a cover 35 for the container 13c. The terms paper and cardboard refer to materials formed in part from wood-based pulps.

As illustrated by FIG. 4, the preferred cover generally comprises three sections, a front 37, a spine 39, and a back 41. It is understood, however, that the laminate 18 forming the cover 35 could take a variety of configurations other than the three section book cover described. Alternative configurations such as boxes or other geometric packaging configurations are envisioned and included in the invention.

The container 13c includes two blister receiving portions 15a, 15b molded using the process described above. The first blister receiving portion 15a is heat sealed to the back 41 of the cover 35 using the process described above. The first blister portion 15a includes a cavity 31 molded to retain a series of commemorative coins surrounded by two raised abutments 43a, 43b. Extending around the middle of the first blister portion 15a, below the cavity 31 and abutments 43a, 43b is a lip 33.

The second blister portion 15b is molded to the front 37 of the laminated cover 35 as described above and essentially comprises a hollow 45 surrounded by an edge 44. The hollow 45 and edge 44 of the second blister portion 15b are configured to fit over the abutments 43a, 43b of the first blister portion 15a such that the edge 44 of the second portion 15b fits against the ridge 33 of the first portion 15a thereby creating a tight press fit when the container 13c is closed. Thus, the container 13c can be closed upon itself by pivoting the front 37 of the cover 35 on the spine 39 such that the second blister portion 15b fits over the first blister portion 15a.

While the above description is given by way of example, it is recognized that numerous other configurations could be designed for the container 13c, as well as such features for closing the laminated cover 35 retaining the blister portions 15a and 15b of the present invention and are included in the present invention. As noted throughout the application the invention lies in the laminating film that can be heat sealed to a blister receiving portion in a container. The inventive film is advantageous over the prior art because it allows for a film that is heat sealable, durable and flexible such that it can accommodate the booklike containers having a blister portion described above.

Although the best mode contemplated by the inventor of carrying out the present invention is disclosed above, practice of the present invention is not limited thereto. As noted throughout the application, numerous alternative configurations of containers and packaging could be manufactured using the inventive film. It will be manifest that various additions, modifications and rearrangements of the features of the present invention may be made without deviating from the spirit and scope of the underlying inventive concept.

Moreover, the individual components need not be formed in the disclosed shapes, or assembled in the disclosed configuration, but could be provided in virtually any shape, and assembled in virtually any configuration. Furthermore, all the disclosed features of each disclosed embodiment can be combined with, or substituted for, the disclosed features of every other disclosed embodiment except where such features are mutually exclusive.

It is intended that the appended claims cover all such additions, modifications and rearrangements. Expedient embodiments of the present invention are differentiated by the appended subclaims.

I claim:

1. A process for forming a thermolaminated specialty package comprising the steps of:
   a) providing an amorphous polyester layer, a polyester layer, and a polymeric base layer;
   b) introducing oxidization inhibiting agents, coloring agents, and ultraviolet light absorbers into at least one of said layers to increase the archival qualities of said layer and to protect commemorative items stored in the package;
   c) after introducing said agents, coextruding the amorphous polyester layer and polyester layer to form a multilayer film;
   d) after coextruding said multilayer film, molding a shaped blister container from said polymeric base layer, the blister container having an outer surface, an inner surface, and a cavity, wherein the blister container comprises a first blister portion with a cavity having a lip and raised abutments to retain commemorative items and a second blister portion with a hollow surrounded by a ridge,
   wherein the hollow and ridge of the second blister portion is configured to fit over the abutments of the first blister portion such that the ridge of the second portion fits against the ridge of the first portion, and
   wherein said blister container is configured to receive one member selected from the group consisting of sound media, containing compact disks, records, audio cassettes, video cassettes, toys, and collectibles;
   e) after the molding of said shaped blister container, welding the amorphous polyester layer of the film onto the polymeric base layer;
   f) after welding said amorphous polyester layer of the film to the polymeric base layer, applying an adhesive layer comprising a polar sealant onto the polyester layer of the film;
   g) providing a paper-based graphical layer and forming said graphical layer into a cover with a front section, a spine section, and a back section;
   h) applying said cover to the polyester layer of said film, wherein the back section of the cover is heat-sealed to the first blister portion and the front section of the cover to the second blister portion;
   i) closing the cover upon itself by pivoting the front of the cover on the spine such that the second blister portion fits over the first blister portion, thereby creating a tight press fit to seal the package closed.

* * * * *